United States Patent [19]

Dick

[11] Patent Number: 5,348,517
[45] Date of Patent: Sep. 20, 1994

[54] TORQUE TRANSFER CASE FOR A FULL TIME FOUR-WHEEL DRIVE SYSTEM

[76] Inventor: Wesley M. Dick, 8220 Fawncrest Pl., Fort Wayne, Ind. 46835

[21] Appl. No.: 997,859

[22] Filed: Dec. 29, 1992

[51] Int. Cl.⁵ ............................................ F16H 37/06
[52] U.S. Cl. .................... 475/210; 180/249; 474/12
[58] Field of Search ............... 180/233, 249; 474/11, 474/12, 69, 70; 475/210

[56] References Cited

U.S. PATENT DOCUMENTS

| | | | |
|---|---|---|---|
| 795,386 | 7/1905 | Cutter . | |
| 2,980,196 | 4/1961 | Van DerBrugghen | 180/73 |
| 3,017,785 | 1/1962 | Van DerBrugghen | 74/472 |
| 3,331,464 | 7/1967 | VanDoorne | 180/44 |
| 3,688,604 | 9/1972 | Schlosser | 74/792 |
| 3,850,050 | 11/1974 | Lemmens | 474/12 |
| 3,884,316 | 5/1975 | Bowers | 474/12 |
| 3,926,020 | 12/1975 | Dantowitz et al. | 74/217 B |
| 3,941,199 | 3/1976 | Williams | 180/249 |
| 4,103,753 | 8/1978 | Holdeman | 180/233 X |
| 4,173,155 | 11/1979 | Togami et al. | 74/230.17 |
| 4,481,004 | 11/1984 | Abbott | 474/28 |
| 4,541,820 | 9/1985 | Sakakibara | 474/17 |
| 4,541,821 | 9/1985 | Sakakibara | 474/17 |
| 4,688,447 | 8/1987 | Dick | 74/665 |
| 4,722,719 | 2/1988 | Klopfenstein | 474/28 |
| 4,735,598 | 4/1988 | Moroto et al. | 474/29 |
| 4,740,191 | 4/1988 | Takano et al. | 474/69 |
| 4,782,721 | 11/1988 | Dick | 74/665 |
| 4,860,612 | 8/1989 | Dick et al. | 74/665 |
| 4,884,653 | 12/1989 | Kouno | 180/233 |
| 4,915,189 | 4/1990 | Sakai | 180/247 |
| 5,069,319 | 12/1991 | Makabe | 192/0.052 |
| 5,105,902 | 4/1992 | Wilson et al. | 180/249 X |

FOREIGN PATENT DOCUMENTS

| | | | |
|---|---|---|---|
| 63-141832 | 6/1988 | Japan | 180/249 |
| 63-188526 | 8/1988 | Japan | 180/249 |
| 2159110 | 11/1985 | United Kingdom | 180/249 |

OTHER PUBLICATIONS

SAE Technical Paper "Electronic Transfer Case for 1990 AeroStar Electronic Four Wheel Drive".

*Primary Examiner*—Dirk Wright
*Attorney, Agent, or Firm*—Oldham, Oldham & Wilson Co.

[57] ABSTRACT

A full time four-wheel-drive system for a vehicle is described which uses a unique torque-transfer case assembly. The transfer case includes a torque input shaft for receiving output torque from the transmission assembly of the vehicle, and front- and rear-output shafts connected to front and rear differentials of the vehicle. The transfer case assembly includes continuously variable belt drive connecting the input shaft to the front and rear output shafts, transferring a predetermined amount of torque to each output shaft. The continuously variable drive arrangement will include at least a primary pulley on the input shaft and a secondary pulley on the front output shaft, the pulleys carrying a belt therebetween. Each pulley comprises a pair of sheaves, which are axially moveable in relation to one another. The pair of sheaves of each pulley are shifted axially relative to one another by an assembly which is responsive to divide torque between the front and rear output shafts in a predetermined relationship. The system operates to substantially maintain this predetermined relationship during normal operation of the vehicle, and balance torque between the front and rear output shafts to yield improved vehicle handling, stability and feel.

17 Claims, 5 Drawing Sheets

TORQUE TRANSFER CASE FOR A FULL TIME FOUR-WHEEL DRIVE SYSTEM

BACKGROUND OF THE INVENTION

The present invention relates generally to a vehicle four-wheel-drive transfer case, and in particular to a four-wheel-drive transfer case which provides automatic torque balancing, differentiation, and traction enhancement in the event of wheel slip.

Four-wheel-drive systems for vehicles are being utilized to a greater extent, providing increased traction and safety of operation for the vehicle. Recently, "full time" four-wheel-drive systems have been developed for vehicles, wherein a transfer case is typically provided with an interaxle differential for dividing torque between the vehicle front and rear differentials. The torque transfer mechanisms to supply drive power to the four wheels of a vehicle are usually connected to the vehicle transmission which is driven by the vehicle engine.

In a vehicle provided with a "full time" two-wheel-drive system, to prevent excess slippage between the front and rear wheels, the transfer case has included a selectively engageable clutch, which is operative to lock the interaxle differential upon sensing predetermined slippage between the front and rear output shafts of the transfer case. As an example, a transfer case has been designed to utilize electronic control, and includes a planetary interaxle differential for proportional torque split. An electromagnetic clutch is locks the differential to enhance mobility when road coefficients cause single wheel or single axle traction loss. The actuation of the clutch system is monitored by an electronic module and sensor system, which can detect abnormal amounts of differentiation in the interaxle unit and correct for this differentiation. This type of system does improve vehicle handling and stability, but may not adequately balance torque between the front and rear axles, nor adequately account for differentiation in the full time four-wheel-drive system.

There has thus been found a need to provide improved torque balancing and differentiation along with the ability to provide extra torque in the event of single-wheel or single-axle traction loss for improved mobility and stability in a full time four-wheel-drive system associated with a vehicle.

SUMMARY OF THE INVENTION

The invention is therefore directed to a full time four-wheel-drive system for a vehicle having front and rear drive wheels, and an engine and transmission assembly providing output torque to the front and rear wheels of the vehicle. The four-wheel-drive system a unique torque-transfer case assembly, including a torque input shaft for receiving output torque from the transmission assembly of the vehicle, and front- and rear-output shafts connected to front and rear differentials of the vehicle. The transfer case assembly inches means for connecting the input shaft to the front and rear output shafts, transferring a predetermined amount of torque to each output shaft, comprising a continuously variable belt drive. The continuously variable drive arrangement will include at least a primary pulley on the input shaft and a secondary pulley on the front output shaft, the pulleys carrying a therebetween. Each pulley comprises a pair of sheaves, which are axially moveable, in relation to one another. The pair of sheaves of each pulley are shifted axially relative to one another by means which are responsive to divide torque between the front and rear output shafts in a predetermined relationship. The system operates to substantially maintain this predetermined relationship during normal operation of the vehicle, and balance torque between the front and rear output shafts to yield improved vehicle handling, stability anti feel.

The means to shift the pulley sheaves may comprise a ball ramp mechanism which drivingly connects the rear output shaft to the input shaft, with the magnitude of the torque transferred to the rear output shaft from the input shaft depending upon the angles established in the ball ramp assembly. As an alternative to the ball ramp assembly, desired torque distribution is provided by an electronic control system which monitors the torque to both the front and rear output shafts and controls a mechanism to cause shifting of the moveable sheaves to vary the ratio and division of torque to the front and rear output shafts. Alternatively, the transfer case assembly may include an additional drive in association with the continuously variable drive system in a dual path torque transmission arrangement.

A main advantage of the transfer case assembly of the invention is therefore to provide differentiation between front and rear output shafts in a full time four-wheel-drive system, and enable torque balancing and transfer to each of the output shafts in a predetermined relationship. The system provides traction enhancement by increasing torque transfer in the event of a predetermined amount of wheel slip, and therefore yield improved vehicle handling, stability, and mobility in an all-wheel-drive vehicle.

BRIEF DESCRIPTION OF THE DRAWINGS

These and other advantages of the present invention will become readily apparent one skilled in the art from a reading of the following detailed description in conjunction with the attached drawings, wherein.

DETAILED DESCRIPTION OF THE INVENTION

Figure 1:
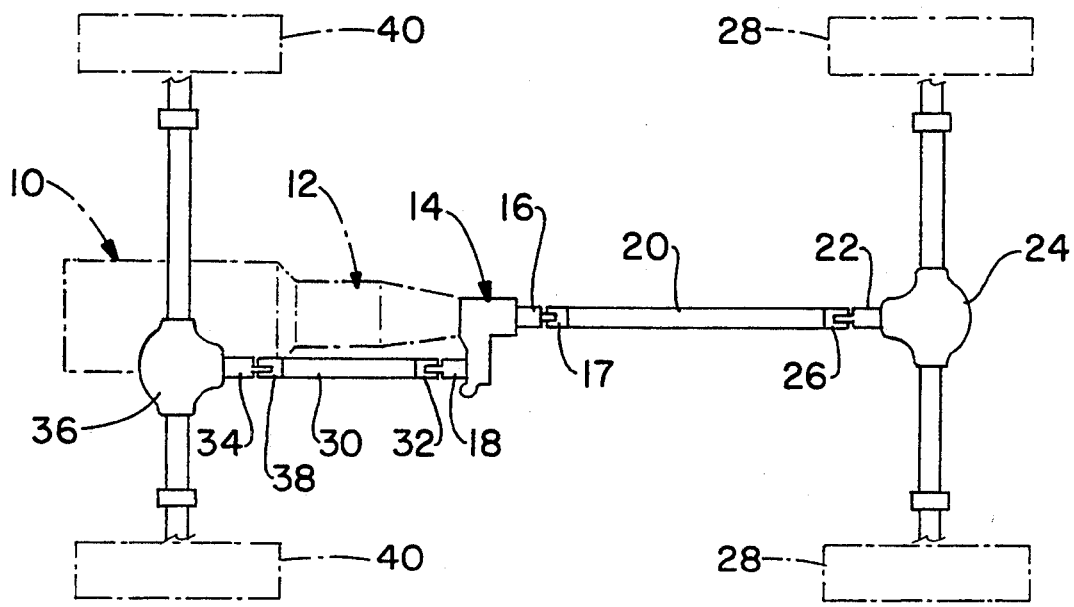
FIG. 1 is a top plan view of a four-wheel-drive system which utilizes the transfer case of the invention.

Referring to FIG. 1, there is shown a vehicle four-wheel-drive system which utilizes the transfer case of the invention. As shown in FIG. 1, a vehicle includes a drive engine (10), which is coupled with a transmission unit (12) of conventional configuration. The transmission unit (12) is secured to a transfer case (14) in accordance with the invention, which includes a rear output shaft or yoke (16) as well as a front output shaft or yoke (18). The rear output shaft (16) is connected to a rear drive shaft (20) by means of a universal joint connection, and drive shaft (20) is in turn connected to an input shaft or yoke (22) of a rear differential unit (24) by means of a universal joint coupling (26). The rear differential (24) is adapted to divide torque from the drive shaft (20) between the rear wheels (28) of the vehicle. Similarly, the front output shaft (18) of transfer case (14) is connected to the rearward end of a front drive shaft (30) by means of a universal joint coupling (32). The front drive shaft (30) has the forward end thereof connected to an input shaft or yoke (34) of a front differential unit (36) by means of a universal joint coupling (38). The front differential unit (36) is adapted to divide torque received from the front drive shaft (30) between the front wheels (40) of the vehicle.

Figure 3:
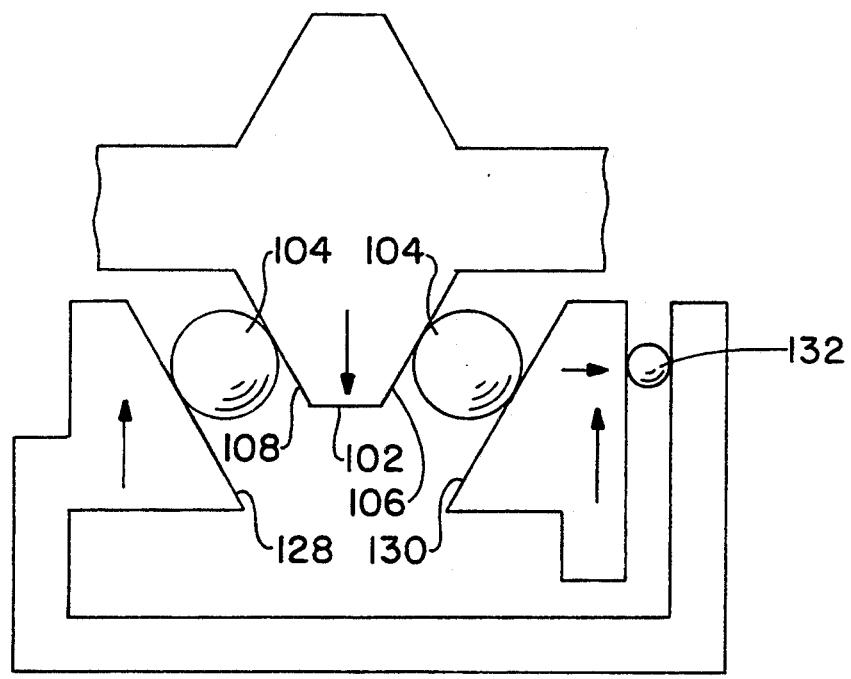
FIG. 3 is an enlarged partial sectional view through the ball ramp mechanism in the embodiment of FIG. 2.
Figure 2:
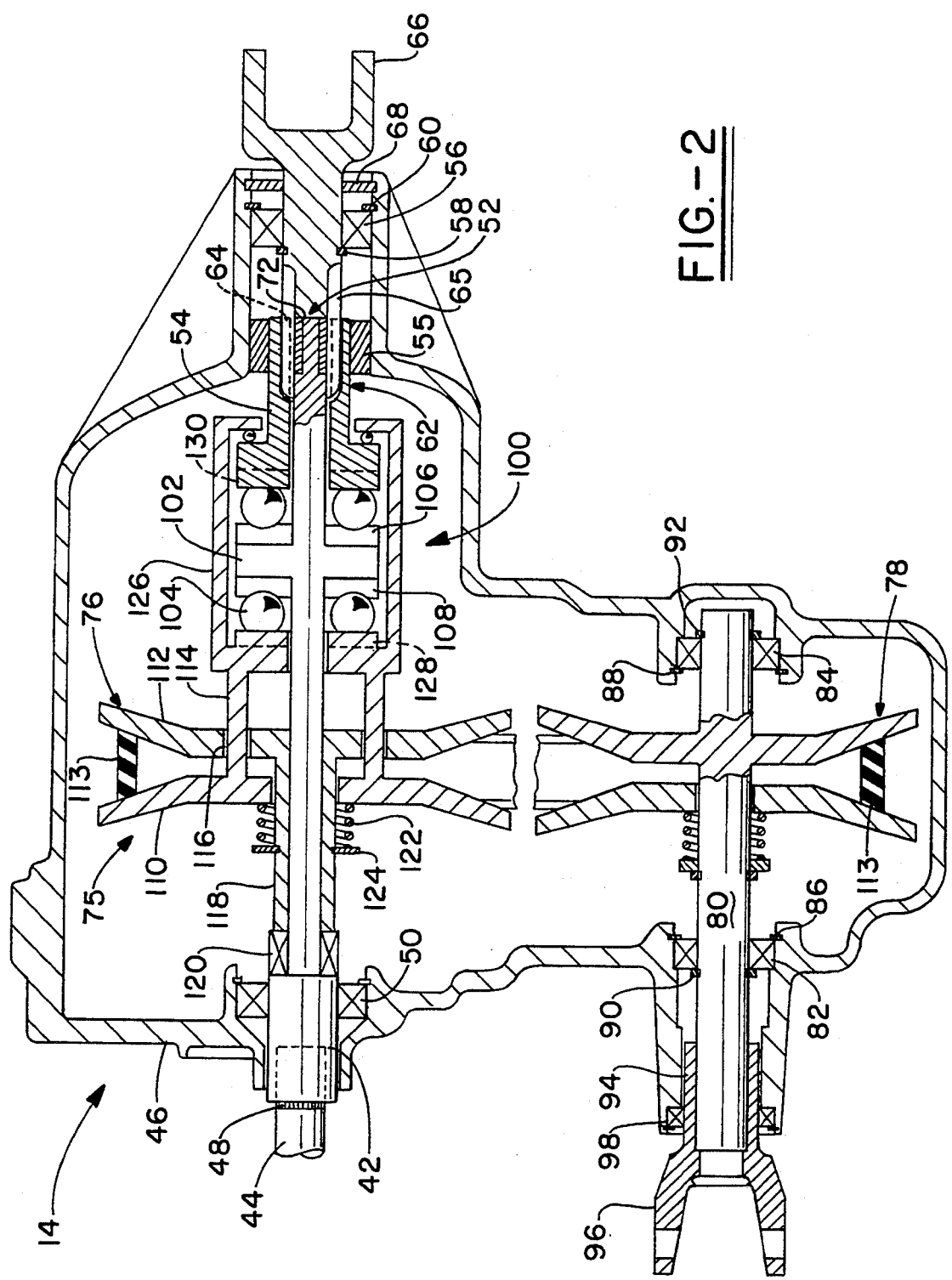
FIG. 2 is a sectional view through the transfer case assembly of the invention, illustrating a first embodiment of the invention.

Referring now to FIGS. 2 and 3, the specific construction of a first embodiment of the transfer case (14) of the invention will be discussed in more detail. As seen in FIG. 2, the transfer case (14) includes a torque input shaft (42) which receives output torque from the vehicle transmission. The transfer case (14) includes an outer housing (46), which generally will include sections secured together by a plurality of bolts or the like. The transfer case input shaft (42) has a forward end connected to the rearward end of the transmission output shaft (44), by means of a spline connection at (48), which prevents relative rotation between output shaft (44) and input shaft (42). The forward end of the input shaft (42) is rotatably supported in the housing (46) by means of a ball bearing assembly (50). Further, the input shaft (42) is sealed within all opening provided in the front face of the housing (46) by annular seal means in a known manner. The input shaft (42) extends into the transfer case housing (46) and has a rearward end positioned within an annular recess (52) of a rear output shaft (54) of the transfer case assembly (14). An annular bushing (72) is mounted within the annular cavity (52) of the rear output shaft (54) to rotatably support the rear end of the input shaft (42) therein. The rear output shaft (54) comprises a slidable splined sleeve or collar section (62) coupled to a rear output yoke (66). The rearward end of sleeve (62) is provided with internal splines (64) which receive an external splined section (65) of rear output yoke (66). The rear output yoke (66) is a fixed yoke, and the collar (62) provides a slip spline in association with the rear output yoke (66) to allow relative axial movement between the slidable splined collar (62) and rear output yoke (66). In this configuration, the rear output yoke (66) is restrained from axial movement, with the slip spline enabling relative axial movement of section (62) in association with the ball-ramp mechanism (100) which will be hereinafter described. The slip spline may be formed in a known manner, and may use a ball-type spline or a Glidecote ® plastic having a low coefficient of friction. As an alternative, a slip yoke could be provided to allow axial movement of the rear output a slip spline in association with the rear output yoke (66) to allow relative axial movement between the slidable splined collar (62) and rear output yoke (66). In this configuration, the rear output yoke (66) is restrained from axial movement, with the slip spline enabling relative axial movement of section (62) in association with the ball-ramp mechanism (100) which will be hereinafter described. The slip spline may be formed in a known manner, and may use a ball-type spline or a Glidecote ® plastic having a low coefficient of friction. As an alternative, a slip yoke could be provided to allow axial movement of the rear output shaft (54). The rear output yoke (66) associated with rear output shaft (54) is rotatably supported within the rear of transfer case housing (46), by means of a bushing (55) and ball bearing assembly (56), which is secured relative to the yoke (66) by means of a snap ring (58) and relative to the housing (46) by means of a snap ring (60). The rear output shaft (54) is provided with external splines (64), and is adapted to receive a splined section of a rear output yoke (66). The rear output shaft (54), and particularly rear output yoke (66) is sealed with respect to a rear opening provided in the housing (46) by annular sealing means (68).

Also as seen in FIG. 2, there is proivded a continuously variable v-belt drive which is supported on the torque input shaft (42) of the transfer case assembly (14). The continuously variable belt drive is generally indicated at (75), and includes a primary or drive pulley (76) mounted in association with the input shaft (42), and a secondary pulley (78) mounted in association with a front output shaft (80). The front output shaft (80) is rotatably supported in the transfer case housing (46) by means of ball bearing assemblies (82) and (84) or other types of bearing assemblies in a known manner. The ball bearing assemblies (82) and (84) is secured relative to the housing (46) by means of snap rings (86) and (88), while being secured relative to tje front output shaft (80) by means of snap rings (90) and (92). The forward end of the front output shaft (80) is provided with external splines (94) for receiving internal splines provided on a sleeve portion of a front output yoke (96) to prevent relative rotation therebetween. An annular seal assembly (98) is provided within a front opening in transfer case housings (46), to seal about the front output shaft (80) and corresponding front output yoke (96).

The continuously variable drive (75), including primary pulley (76) and secondary pulley (78), provides torque transfer from the torque input shaft (42) to the front output shaft (80). Driving torque is transferred to the rear output shaft (54) from input shaft (42) assembly through a ball ramp assembly generally indicated at (100). In the ball ramp system (100), the torque input shaft (42) carries a first ball ramp portion (102) extending radially from the shaft and acting upon a plurality of ball bearings (104) in a dual ball ramp configuration. As seen in FIG. 3, the ball ramp portion (102) of input shaft (42) includes two ramp bearing surfaces (106) and (108) acting on a pair of balls (104). Corresponding to this structure, the primary pulley (76) comprises a moveable sheave (110) and a fixed sheave (112), which are relatively slidable in relation to one another in an axial direction. The hub portion (114) of the moveable sheave (110) is adapted to extend through an annular opening (116) in the fixed sheave (112) as shown in FIG. 2. The hub portion (118) of the fixed sheave (112) is rotatably mounted on the torque input shaft (42) by means of a ball bearing assembly (120). The hub portion (118) of the fixed sheave (112) also carries a bias spring member (122), which is fixed in position by means of a snap ring (124). The bias spring member (122) is adapted to act on the moveable sheave (110), such that the spring member (122) actuates and biases the moveable sheave (110), imparting a force which acts to squeeze sheaves (110) and (112) together. In association with hub portion (114) of the moveable sheave (110), an extension generally indicated at (126) includes a ball ramp portion (128), which together with ball ramp portion (102) of the input shaft (42), forms a load camming mechanism for torque transfer through the continuously variable drive (75) to the front output shaft (80) of transfer case (14). Similarly, rear output shaft (54) includes a ball ramp portion (130) which together with ball ramp portion (106) of the input shaft (42) form a load cam mechanism for actuating torque transfer from the input shaft (42) to rear output shaft (54). The extension (126) of hub portion (114) associated with the moveable sheave (110) also extends beyond the ramp portion (130) associated with output shaft (54), and is rotatably coupled thereto by means of a ball bearing assembly (132). The rear output shaft (54), and particularly splined sleeve section (62), is free to move axially relative to the torque input shaft (42). The slip spline provided between the input shaft (42) and splined sleeve (62) enables sleeve (62) to move in association with the ball ramp mechanism (100), with axial movement limited by the degree of movement of the moveable sheave (110) associated with primary pulley (76) and the extension of moveable sheave (110).

The ball ramp assembly (100) of the invention transfers torque from the input shaft (42) to the rear output shaft (54) via the rear ball ramp mechanism consisting of ramp portions (106) and (130) and the associated ball (104) disposed therebetween. The amount of torque transferred to the rear output shaft will depend upon the angle established on the ramp portions (106) and (130). Similarly, transfer of torque from the input shaft (42) to the front output shaft (80) of transfer case (14) is provided by means of the continuously variable drive (75). Transfer of torque to the front output shaft (80) via the continuously variable belt drive (75) will depend upon the position of the moveable sheave (110) relative to the fixed sheave (112) of the primary pulley (76). It should be recognized, that the angles of the ball ramp systems will determine the distribution of torque transferred to both the rear output shaft (54) and front output shaft (80), to allow any desired torque split between the front and rear output shafts. Although the ramps shown in FIGS. 2 and 3 are symmetrical, indicating an even torque split between front and rear output shafts under normal operating conditions, it is contemplated that an uneven torque split is achieved by merely varying the angles of the ramps acting on the respective front or rear output shafts if desired. For example, if a vehicle is desired to maintain a rear drive/reel a two-thirds to one-third distribution is chosen, with the high torque side driving the rear output shaft (54), while at the same time achieving the front wheel drive's front traction advantage in a four-wheel-drive system.

Figure 4:
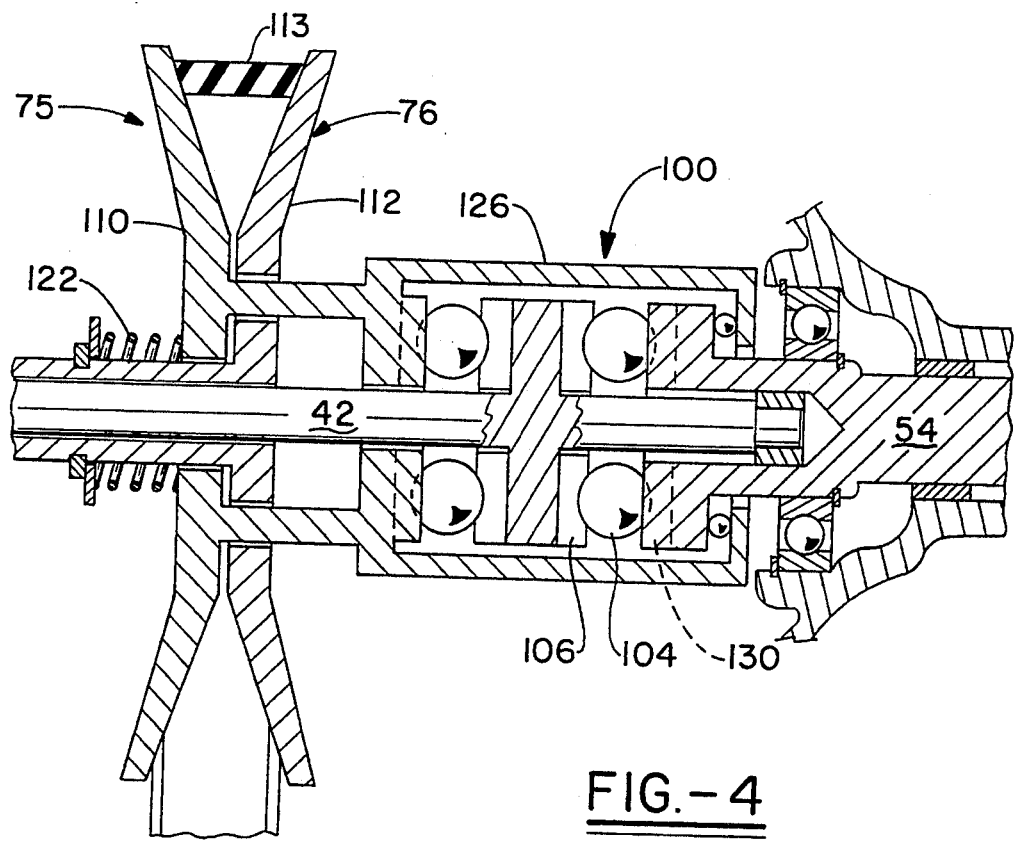
FIG. 4 is an enlarged partial sectional view taken of the transfer case assembly, illustrating the transfer of additional torque to the front output shaft.

The ball ramp configuration of the invention also achieves balancing of torque in the desired and predetermined ratio between the rear output shaft (54) and front output shaft (80) driven by the continuously variable belt drive (75). This balancing of torque distribution between the front and the rear output shafts of the transfer case will be seen more distinctly in FIGS. 4 and 5. As seen in FIG. 4, the primary pulley (76) is shown, and reflects the torque balancing effect of the ball ramp mechanism associated with this embodiment of the invention. Although the secondary pulley of the continuously variable drive (75) is not shown, it should be understood that it corresponds to actuation of the primary pulley (76) to effect variable drive of the front output shaft (80) as previously described. In operation, the transfer case of the invention will distribute torque from the input shaft (42) to the front and rear output shafts in a predetermined relationship, and the ball ramp mechanism will continuously act to balance torque between the output shafts according to this predetermined relationship. In FIG. 4, there is illustrated the ability to transfer additional torque to the front output shaft (54) to compensate for an increased torque on the rear output shaft. In operation, if an increased torque is applied to the rear output shaft due to cornering or other operational characteristic of the vehicle, additional torque will be transferred through the ball ramp system including ramps (106) and (130) and the associated ball (104). This increased torque will result in the ball (104) traveling on ramps (106) and (130) in a manner such that the moveable sheave (110) would be urged toward the fixed sheave (112) by movement of the sheave extension (126) toward rear output shaft (54) in association with axial movement of shaft (54). The bias spring member (122) will facilitate actuation of the moveable sheave (110) resulting in a configuration of the primary pulley (76) as seen in FIG. 4. As the moveable sheave (110) is urged toward the fixed sheave (112), the belt (t 13) will be urged upwardly within sheaves (110) and (112), such that the system will try to overdrive the front output shaft. In this configuration of the continuously variable drive (,75), if the front output shaft is restricted by the pavement on which the wheels of the vehicle travel, then torque transfer from the input shaft (42) to the front output shaft will be increased, and torque between the front and rear output shafts will be balanced.

Figure 5:
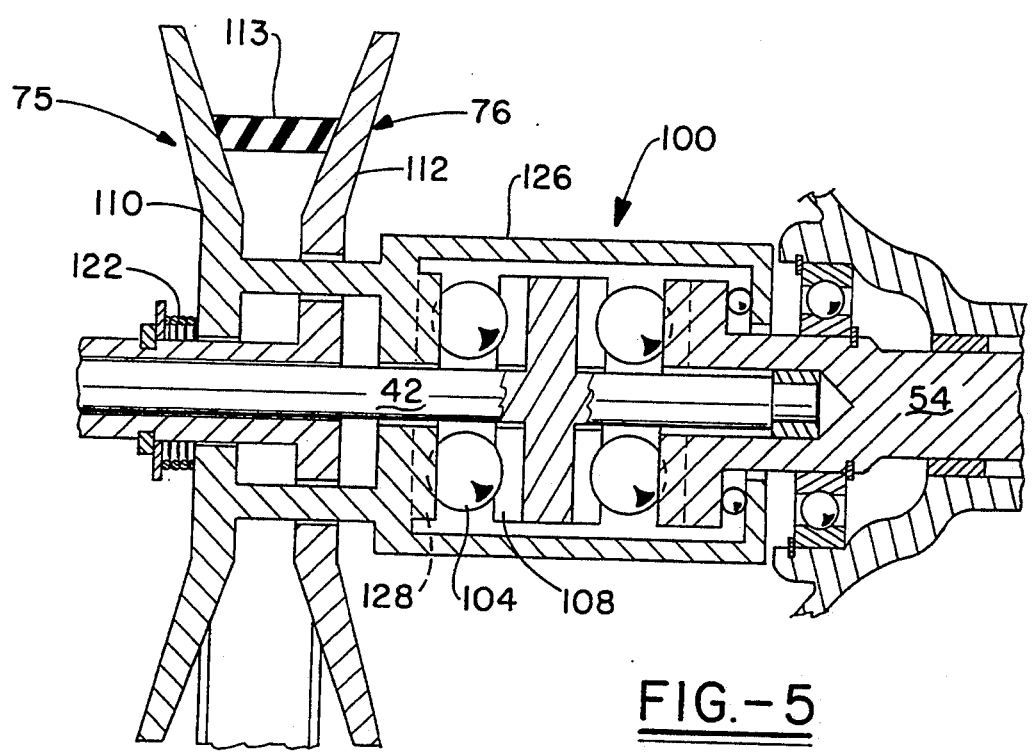
FIG. 5 is an enlarged partial sectional view through the transfer case assembly, illustrating the transfer of additional torque to the rear output shaft.

Conversely, as seen in FIG. 5, if more torque is experienced on the front output shaft, the additional torque would operate on the ball ramp assembly comprising ramps (108) and (128) and the associated ball (104). As the ball (104) travels on ramps (108) and (128), this would urge the sheave extension (126) associated with moveable sheave (110) away from the rear output shaft (54), resulting in shifting of the moveable sheave (110) away from the fixed sheave (112) as seen in FIG. 5. In this condition, the torque transfer to the front output shaft via the continuously variable drive (75) is reduced, tending to overdrive the rear output shaft (54). Again, if the speed of the rear output shaft is restricted by the pavement, then the torque transferred to the rear output shaft (54) will be increased to effect balancing of torque between the front and rear output shafts.

The continuously variable drive (75) provides differentiation between the front and rear output shafts as desired. Normal vehicle cornering produces a certain amount of required differentiation, which is suitably provided by the continuously variable drive (75). The differentiation required for normal vehicle cornering also must be distinguished from wheel slip or spin, and the continuously variable drive (75) is configured such that its limits correspond to parameters associated with normal differentiation due to cornering. Normal differentiation is defined as that which can occur in a corner of a given radius before a "skid-out" speed is reached. The control of the ratio of torque transfer from the torque input shaft to the front and rear output shafts allows for normal differentiation due to steer angle and wheel or tire radius variations, and the dual ball ramp assembly will effectively balance torque transfer to substantially maintain the predetermined ratio between the front and rear ts.

In addition to providing normal interaxle differentiation, the transfer case assembly of the invention also provides traction enhancement. When a front or rear wheel spins out due to a low coefficient surface, more torque will be delivered to the opposite axle which is on a less slippery surface. This traction enhancement increases the ability of the vehicle to move itself and to improve vehicle handling and stability. In the present invention, traction enhancement is obtained upon the occurrence of a predetermined amount of wheel slip, which correlates to the maximum speed of the continuously variable belt drive (75). As the continuously variable torque transfer arrangement inherently has limits in the amount of torque which can be transferred, this limit is utilized to provide additional torque transfer upon the occurrence of a single wheel or single axle traction loss, to provide additional traction to the output shaft where no traction loss has occurred and enhance mobility of the vehicle. This traction enhancement is provided by the dual ball ramp assembly, and occurs after a predetermined amount of wheel slip correlating to the maximum speed of the continuously variable drive. Upon the occurrence of a wheel slip, the torque applied to the corresponding output shaft associated with that wheel will drop off, and the balancing function of the ball ramp mechanism (100) as previously described will be actuated. It should be recognized that upon actuation of the torque balancing function, it is possible that the maximum speed of the continuously variable belt drive (75) will be reached, wherein the balancing function will no longer restrict in additional torque being transferred to the output shaft associated with the wheel slip. When the limits of the continuously variable drive are exceeded, additional torque will then be delivered to the opposite output shaft and axle which is on a less slippery surface.

Figure 6:
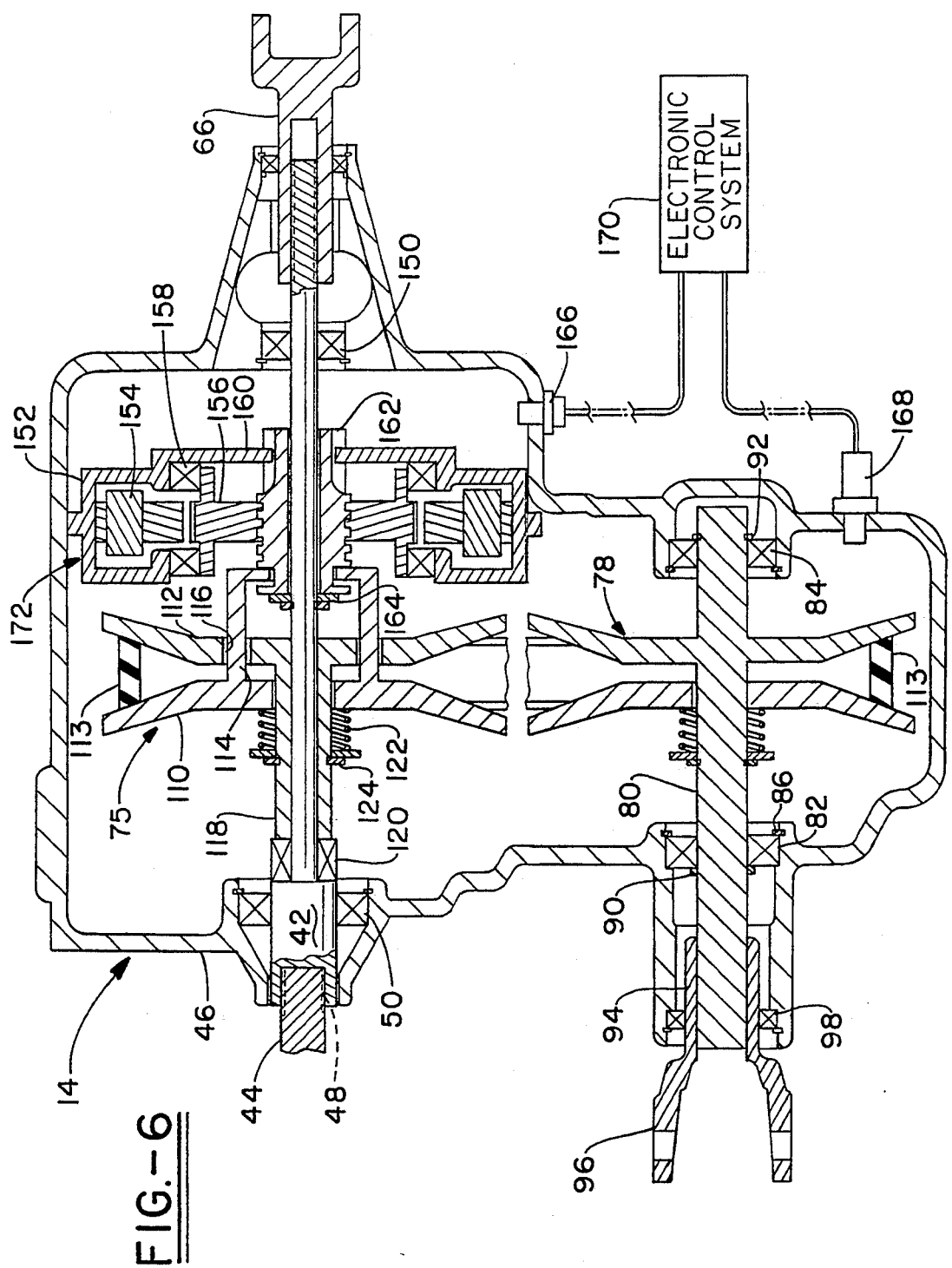
FIG. 6 is a sectional view through the transfer case assembly, illustrating an alternative embodiment of the invention.

Turning now to FIG. 6, an alternative embodiment of the invention is shown to include an electronic control system adapted to monitor the torque of both the front and the rear output shafts of the transfer case assembly, and to control operation of the continuously variable drive (75) associated with the interaxle transfer case. In this embodiment, only distinctions between this and the embodiment of FIGS. 2-5 will be referred to, and common reference numerals will be used for common components of the transfer case assembly.

Electronic control of torque distribution may provide better mobility and handling characteristics in that the limits of the continuously variable drive system would not need to be exceeded in order to transfer additional torque in the event of traction loss. In accordance with this embodiment, the input shaft (42) extends into the transfer case housing (46) and has its rearward end coupled to rear output yoke (66). The input shaft (42) rotatably supported within housing (46) by ball bearing assemblies (50) adjacent the front end, and ball bearing assemblies (150) positioned adjacent the rear end of input shaft (42). The input shaft (42) is coupled to the rear output yoke (66) by means of a spline connection, to prevent relative rotation therebetween. Similarly, the front output shaft (80) is drivingly engaged to the input shaft (42) by means of the continuously variable belt drive (75) as previously described. The torque of the rear output shaft (54) is monitored by means of a torque sensor (166) which may be any conventional means to sense the torque of shaft (54). Similarly, the torque of the front output shaft (80) is monitored by means of a torque sensor (168) as part of an electronic control system. The outputs of the torque sensors (166) and (168) are connected to an electronic control system, generally indicated at (170) which includes processing means to determine the torque on the output shafts. The electronic control system (170) in turn controls an adjustable mechanism generally indicated at (172). The adjustable mechanism (172) is adapted to act upon the hub extension (114) of moveable sheave (110), to effect shifting of moveable sheave (110) relative to fixed sheave (112) associated with primary pulley (76) of the continuously variable drive (75). In this manner, distribution of torque from the input shaft (42) can be effectively controlled in response to the detected torques of both the front output shaft (80) and rear output shaft (54) in the system. Shifting of moveable sheave (110) by means of adjustable mechanism (172) is performed in response to the detected torques sensed form the front and rear output shafts to properly distribute torque in the desired manner.

As shown in FIG. 6, the adjustable mechanism (172) may comprise an electric motor device positioned around the input shaft (42), being controlled by the electronic control system (170). The adjustable mechanism (172) may thus comprise a motor housing (152) supported within transfer case housing (46). The motor housing (152) includes field windings or stator windings (154) positioned relative to an armature or rotor (156) which is supported relative to motor housing (152) by means of ball bearing assemblies (158) or the like. The electronic control system (170) will provide actuating power to the stator windings (154) of the motor assembly to produce rotation of the armature (156) relative to stator (154) and motor housing (152). The motor housing (152) further includes an extension (160) which is splined or tanged onto a rotatable sleeve (162) which cooperates with hub extension (114) of moveable sheave (I 10). The armature (156) is also provided with external threads which mate with the threaded portion of shift collar or sleeve (162). Upon actuation of the motor, the armature (156) will be made to rotate, which will in turn cause axial movement of the shift collar (162). The shift collar (162) is restrained from rotation by means of the housing extension (160), but the spline connection will allow axial movement of collar (162). In this configuration, it should be recognized that the armature (156) may be rotated in alternative directions to effect axial movement of shift collar (162) and resulting movement of movable sheave (110) by means of hub extension (114). The hub portion (114) of movable sheave (110) may be connected to shift collar (162) by means of a washer and snapping assembly shown at (164).

Although the adjustable mechanism (172) is described as an electric motor device to perform shifting of moveable sheave (110) in the variable drive (75), the adjustable mechanism (172) may be of any suitable type, including electronic, hydraulic, or pneumatic mechanisms to effect shifting of moveable sheave (110) relative to fixed sheave (112) of pulley (70. In this manner, torque distribution to the front and rear output shafts is regulated as a function of the measured torque, which may result in an improved control system as the limits of the continuously variable drive (75) would not need to be exceeded in order to transfer additional torque when necessary.

Figure 7:
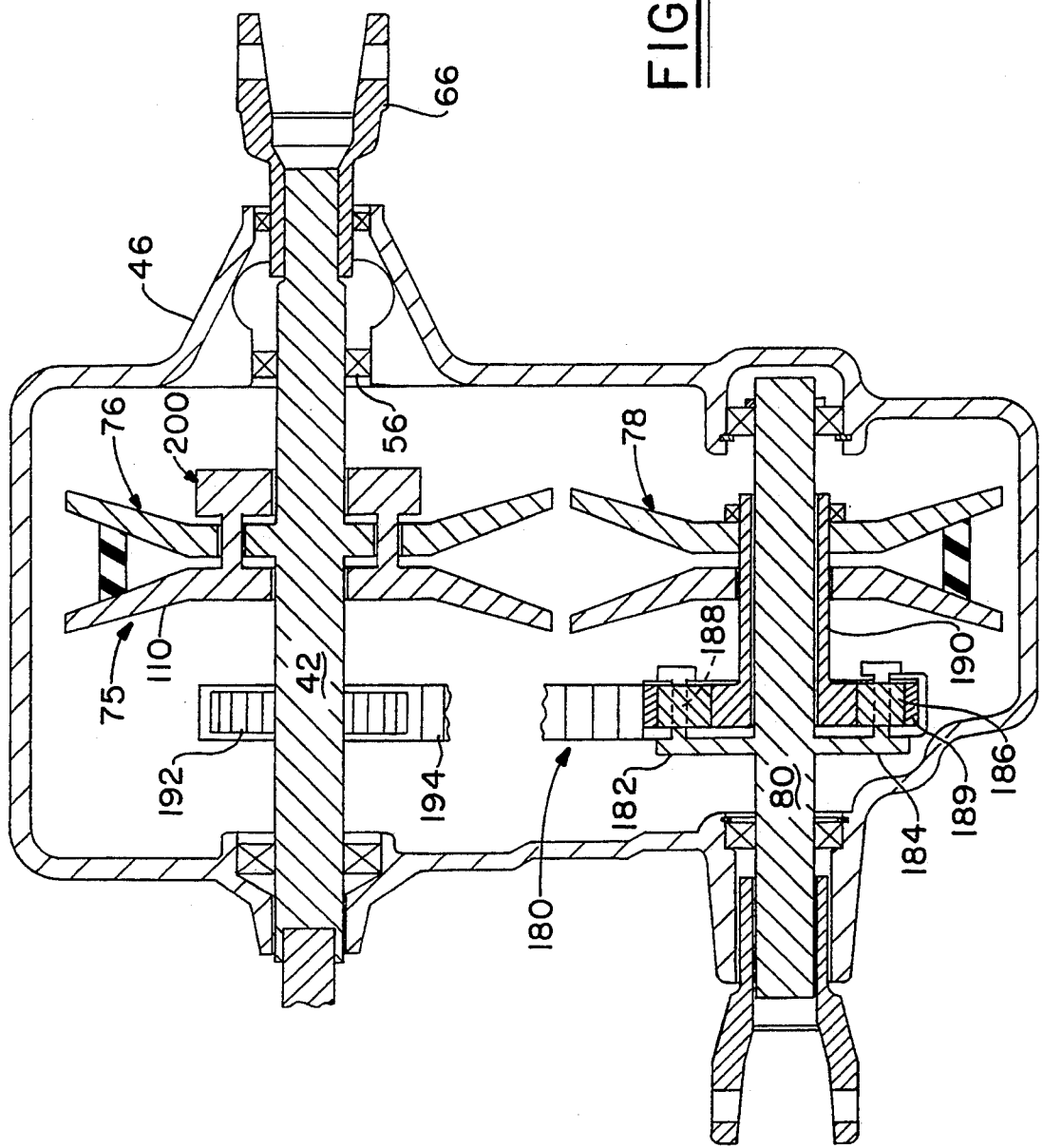
FIG. 7 is a sectional view through the transfer case assembly, illustrating yet another embodiment of the invention.

Turning now to FIG. 7, an alternate embodiment of the invention is shown to include a dual-path torque transmission arrangement. In this embodiment, only distinctions between the previous embodiments will be referred to, and common reference numerals will be used to common components. As previously mentioned, it is possible in some vehicles that using the continuously variable drive to effect torque transfer in a predetermined relationship between front and rear output shafts may result in the limits of the continuously variable drive being exceeded under abnormal operating conditions of the vehicle. Due to the limitations of continuously variable drive technology, it may therefore be desirable to provide a fixed drive mechanism which is used in parallel with the continuously variable drive to transmit a fixed amount of torque from the input shaft to the front and rear output shafts of the transfer case. The continuously variable drive is used to transmit a varying amount of additional torque in the dual path torque transfer arrangement, to achieve an increase in torque of several times or the reduction in the size of continuously variable drive required. The torque transferred by the constant drive can be set to eliminate the possibility that the limits of the continuously variable drive will be exceeded, even under conditions of wheel slip or the like. In this embodiment, the input shaft (42) carries a conventional chain-belt drive generally indicated at (180) for rotation therewith. The chain-belt drive (180) is in turn coupled to a planet-gear set (182) mounted in association with the front output shaft (80) in the transfer case. The planetary gear set (182) includes a planet carrier (184) formed integrally with front output shaft (80) or coupled thereto by means of spline connection to prevent relative rotation between the planet carrier (184) and front output shaft (80). The planet carrier (184) carries a plurality of circumferentially spaced apart planet gears (186), each of which are rotatably mounted about a separate shaft (188). The planetary gear set (182) further includes a ring gear (189) which will include internal ring gear teeth which engage the gear teeth of each of the planet gears (186). The planet gear set (182) further includes a sun gear (190) rotatably mounted on the front output shaft (80). In this embodiment, the chain belt of drive (180) is connected to the ring gear of the planetary gear set (182) to transfer torque from the input shaft (42) to ring gear (189) via the sprocket set (192) mounted on input shaft (42) which carries the chain belt (194) thereon. Torque from the input shaft (42) will therefore be transferred in a predetermined relationship through the ting gear (189) and planetary gears (186) ill the planetary gear set to transfer torque to the carrier (184) and to front output shaft (180) in predetermined relationship. Further, the sun ring gear (190) of the planetary gear set (182) has supported thereon the pulley (78) associated with the continuously variable belt drive (75). The continuously variable belt drive mechanism (75) is therefore connected to the sun gear (190) of the planetary gear set to transfer the desired amount of torque from the input shaft (42) to the rear output of the transfer case assembly. In this embodiment, the input shaft (42) has a rear output yoke (66) mounted thereon, and is rotatably supported within transfer case housing (46) by means of ball bearings (56). The torque transferred to the rear output yoke (66) will vary depending upon the continuously variable drive (75) in the transfer case assembly. As described in previous embodiments, the continuously variable belt drive (75) may be controlled by the ball ramp mechanism or alternatively by the electronic control system as desired. In the embodiment of FIG. 7, the means to shift moveable sheave (110) of the continuously variable drive (75) is shown in block form and generally indicated at (200), and may comprise each of the embodiments previously described.

In the preferred embodiment, more torque will be transferred through the chain drive (180) to the ring gear (189), than through sun gear (190). For example, two-thirds of the input torque will be transferred through the ring gear, while one-third of the input torque transferred through the sun gear so as to reduce the requirements of the continuously variable drive in the system. In this embodiment, control or torque transfer to both the front and rear output shafts is maintained in a manner similar to the embodiments previously described. Input torque can be divided in a predetermined relationship between the front and the rear outputs, while the chain drive yields the ability to transfer increased torque without the limits of the continuously variable drive being exceeded. Thus, the arrangement again provides differentiation, torque balance, and traction enhancement in the event of a predetermined amount of wheel slip.

The transfer case for the full time four-wheel-drive system of the invention has been illustrated and described by what are considered to represent preferred embodiments thereof. Although described in terms of preferred embodiments, it should be appreciated that various modifications could be made without departing from the spirit or scope of the invention as defined by the attached claims.

What is claimed is:

1. A full time four-wheel-drive system for a vehicle having front and rear drive axles, comprising,
a transfer case assembly including an input shaft for receiving output torque from the transmission of a vehicle, and front and rear output shafts,
said transfer case assembly including means connecting said input shaft to one of said front or rear output shafts comprising a continuously variable belt drive having at least a drive pulley mounted on said input shaft and driven thereby and a driven pulley mounted on said one of said front or rear output shafts, each pulley comprising a pair of sheaves with at least one sheave being axially moveable in relation to the other sheave of said pair, said pulleys carrying a belt therebetween,
means drivingly connecting said input shaft with the other of said front or rear output shafts,
means for shifting said at least one sheave axially in response to the torque applied to each of said front and rear output shafts, wherein said means for shifting is responsive to divide torque from said input shaft between said front and rear output shafts in a predetermined relationship.

2. The full time four-wheel-drive system of claim 1, wherein,
said means for shifting comprises a ball ramp assembly including a first ramp associated with said input shaft, a second ramp associated with said moveable sheave, and a third ramp associated with said one of said front or rear output shafts, wherein said first ramp cooperates with said third ramp through a first ball positioned therebetween to transfer torque from said input shaft to said output shaft, and said first ramp also cooperates with said second ramp through a second ball positioned therebetween to affect shifting of said moveable sheave, wherein the position of said first and second balls on said ramps controls torque transferred to said front and rear output shafts.

3. The full time four-wheel-drive system of claim 2, wherein,
said moveable sheave has a hub portion and said second ramp is provided on an extension of said hub portion, said extension also being rotatably coupled to said third ramp associated with said output shaft.

4. The full time four-wheel-drive system of claim 2, wherein,
said third ramp is provided in association with a splined sleeve coupled to an output yoke, said splined sleeve forming a slip spline between said input shaft and said output yoke to allow limited axial movement of said sleeve.

5. The full time four-wheel-drive system of claim 2, wherein,
said second and third ramps are symmetrical to provide an even torque split between front and rear output shafts under normal operating conditions of said vehicle.

6. The full time four-wheel-drive system of claim 2, wherein,
said second and third ramps are nonsymmetrical, to provide an uneven torque split between said front and rear output shafts under normal operating conditions.

7. The full time four-wheel-drive system of claim 2, wherein,
said ball ramp assembly balances torque between said front and rear output shafts by providing additional torque to either the front or rear output shafts upon an increase in torque on the other of said output shafts.

8. The full time four-wheel-drive system of claim 2, wherein,
said ball ramp assembly provides additional torque transfer to the front or rear output shafts upon single wheel or single axle traction loss associated with the other of said shafts after a predetermined amount of wheel slip correlating to the maximum speed of said continuously variable belt drive.

9. The full time four-wheel-drive system of claim 1, wherein,
said means for shifting comprises an electronic control system having signals corresponding to at least the torques of said front and rear output shafts input thereto, said electronic control system controlling an adjusting mechanism which shifts said moveable sheave.

10. The full time four-wheel-drive system of claim 9, wherein,
said electronic control system includes measuring means positioned adjacent said front and rear output shafts to measure the torque of the output shafts.

11. The full time four-wheel-drive system of claim 9, wherein,
said electronic control system includes measuring means positioned adjacent said front and rear output shafts to measure the speed of the output shafts.

12. The full time four-wheel-drive system of claim 9, wherein,
said adjusting mechanism comprises an electric motor having a housing and a rotor rotatably supported in said motor housing, said rotor coupled to an axially moveable shift collar supported on said input shaft and connected to said moveable sheave, wherein rotation of said rotor will cause axial movement of said shift collar and said moveable sheave.

13. The full time four-wheel-drive system of claim 1, further comprising,
a fixed drive assembly parallel with said continuously variable belt drive to transmit a fixed amount of torque from said input shaft to one of said front and rear output shafts.

14. The full time four-wheel-drive system of claim 13, wherein,
said fixed drive assembly comprises a chain drive carried on said input shaft for rotation therewith, said chain drive in turn coupled to a planetary gear set mounted on one of said front or rear output shafts, to transfer a fixed amount of torque from said input shaft to said output shaft.

15. The full time four-wheel-drive system of claim 14, wherein,
said planetary gear set includes a carrier having a plurality of circumferentially spaced apart planet gears, a ring gear and a sun gear, wherein said sun gear is rotatably mounted on said front output shaft and said chain drive is connected to said ring gear to transfer a predetermined amount of torque from said input shaft to said ring gear, which transfers torque to said output shaft through said planetary carrier and to said sun gear thereof.

16. The full time four-wheel-drive system of claim 15, wherein,
said sun gear is connected to said driven pulley of said continuously variable belt drive to transfer a predetermined amount of torque from said input shaft in association with said means for shifting said at least one sheaves.

17. The full time four-wheel-drive system of claim 16, wherein,
more torque will be transferred to said ring gear of said planetary gear set, from the chain drive so as to reduce the torque transfer requirements of said continuously variable belt drive.

* * * * *